US009286652B2

(12) United States Patent  
Takishima

(10) Patent No.: US 9,286,652 B2  
(45) Date of Patent: Mar. 15, 2016

(54) SCREEN GENERATING APPARATUS, SCREEN GENERATING SYSTEM, AND SCREEN GENERATING METHOD

(71) Applicant: Naoki Takishima, Kanagawa (JP)

(72) Inventor: Naoki Takishima, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 205 days.

(21) Appl. No.: 13/746,443

(22) Filed: Jan. 22, 2013

(65) Prior Publication Data

US 2013/0194277 A1 Aug. 1, 2013

(30) Foreign Application Priority Data

Jan. 30, 2012 (JP) .................................. 2012-017181

(51) Int. Cl.
| | |
|---|---|
| *G06T 11/00* | (2006.01) |
| *G06T 3/40* | (2006.01) |
| *G06F 17/21* | (2006.01) |
| G09G 5/00 | (2006.01) |
| G09G 5/26 | (2006.01) |

(52) U.S. Cl.  
CPC ................ *G06T 3/40* (2013.01); *G06F 17/214* (2013.01); *G09G 5/00* (2013.01); *G09G 5/26* (2013.01); *G09G 2340/045* (2013.01); *G09G 2340/14* (2013.01)

(58) Field of Classification Search  
CPC combination set(s) only.  
See application file for complete search history.

(56) References Cited

U.S. PATENT DOCUMENTS

| 7,057,617 B1 * | 6/2006 | Nishida .......................... 345/472 |
|---|---|---|
| 7,385,606 B2 * | 6/2008 | Everett et al. ................. 345/467 |
| 9,001,159 B2 | 4/2015 | Kiyotaki |
| 2007/0097403 A1 | 5/2007 | Miyazawa et al. |

FOREIGN PATENT DOCUMENTS

| JP | 10-222333 A | 8/1998 |
|---|---|---|
| JP | 2003-67175 A | 3/2003 |
| JP | 2006-184415 A | 7/2006 |
| JP | 2007-151084 | 6/2007 |
| JP | 2010-219700 | 9/2010 |
| JP | 2011-95962 A | 5/2011 |

OTHER PUBLICATIONS

Japanese Office Action dated Nov. 4, 2015 in corresponding Japanese Application No. 2012-017181.

* cited by examiner

*Primary Examiner* — Barry Drennan  
*Assistant Examiner* — Robert Craddock  
(74) *Attorney, Agent, or Firm* — Harness, Dickey & Pierce, PLC

(57) ABSTRACT

According to an embodiment, provided is a screen generating apparatus that includes: a position information acquirer that acquires a screen position information file that sets a font size of a font included in a screen and position information of an image or a part included in the screen; a screen display size acquirer that acquires a screen display size of a display devise as a target display; a magnification calculator that calculates a magnification by using a predetermined screen display size and the acquired screen display size; a font size determiner that determines a font size in the display devise as the target display based on the calculated magnification; a converter that converts the screen position information file based on the calculated magnification and the determined font size; and a screen generator that generates a screen compatible with the converted screen position information file.

20 Claims, 7 Drawing Sheets

FIG.2

```
<window type="Window" id="ConfigurationWindow" x="4" y="4" width="792" height="436" appearance="COL_XWAP_01B">
 <part type="Label" id="6C172B50-957B-982E-797D-B12977DD3367" x="12" y="16" width="656" height="17" label="Scan Settings" fontSize="RMF17W" foreColor="black" />
 <part type="Button" id="SCREEN_UNIQUE_ID" x="564" y="8" width="108" height="32" label="Preview" shape="COL_XB_D_02B" toggle="check" visible="false">
  <action id="onInit">
   <invokeMethod className="jp.co.XXXXX.xgp.sdip.apl.UIEventDispatcher" methodName="doAction" parameters="'uiEvent','scanPreview','init'" />
  </action>
  <action id="onClick">
   <invokeMethod className="jp.co.XXXXX.xgp.sdip.apl.UIEventDispatcher" methodName="doAction" parameters="'uiEvent','scanPreview','update'" />
  </action>
 </part>
```

FIG.3

| MAGNIFICATION | FONT SIZE |
|---|---|
| 100 | $X_0$ |
| 80 TO 100 | $X_1$ |
| 60 TO 80 | $X_2$ |
| 40 TO 60 | $X_3$ |
| LESS THAN 40 | $X_4$ |

FIG.4

| IMAGE | DISPLAY SIZE |
|---|---|
| FILE A_8.1 | 8.1 |
| FILE A_4.3 | 4.3 |
| ⋮ | ⋮ |

SCREEN GENERATING APPARATUS, SCREEN GENERATING SYSTEM, AND SCREEN GENERATING METHOD

CROSS-REFERENCE TO RELATED APPLICATIONS

The present application claims priority to and incorporates by reference the entire contents of Japanese Patent Application No. 2012-017181 filed in Japan on Jan. 30, 2012.

BACKGROUND OF THE INVENTION

1. Field of the Invention

The present invention relates to a screen generating apparatus, a screen generating system, and a screen generating method.

2. Description of the Related Art

A large variety of types of devices have appeared; and displays mounted thereon are understandably varied in many ways. Displays of different sizes are thus very often used among different types of devices. In general, in order for a software application to be compatible with displays of different sizes, the software is rewritten or the screen is virtually enlarged or reduced by hardware. Japanese Patent Application Laid-open No. 2007-151084, for example, discloses a technique that reduces images to be displayed according to the size of the display area.

The technique in the related art, however, has a problem in that images cannot be easily or sharply displayed when displayed on displays of different sizes. For example, the technique for reducing an image according to the size of the display area may fail to produce a sharp image because of its failure to activate a specific resolution in time for matching a new display of a different size. This can happen likewise in the technique for enlarging or reducing the screen by hardware. If software is to be rewritten, redesigning and reprogramming involve an increased number of man-hours, which is not favorable.

There is a need to provide a screen generating apparatus, a screen generating system, and a screen generating method that can easily generate a sharp display on displays of different sizes without requiring any additional development man-hours.

SUMMARY OF THE INVENTION

It is an object of the present invention to at least partially solve the problems in the conventional technology.

According to an embodiment, provided is a screen generating apparatus that includes: a position information acquirer that acquires a screen position information file that sets a font size of a font included in a screen and position information of an image or a part included in the screen; a screen display size acquirer that acquires a screen display size of a display devise as a target display; a magnification calculator that calculates a magnification by using a predetermined screen display size and the acquired screen display size; a font size determiner that determines a font size in the display devise as the target display based on the calculated magnification; a converter that converts the screen position information file based on the calculated magnification and the determined font size; and a screen generator that generates a screen compatible with the converted screen position information file.

According to another embodiment, provided is a screen generating system that includes: a server; and a screen generating apparatus. The server includes: a screen position information file storage that stores therein a screen position information file that sets a font size of a font included in a screen and position information of an image or a part included in the screen. The screen generating apparatus includes: a position information acquirer that acquires the screen position information file from the server; a screen display size acquirer that acquires a screen display size of a display devise as a target display; a magnification calculator that calculates a magnification by using a predetermined screen display size and the acquired screen display size; a font size determiner that determines a font size in the display devise as the target display based on the calculated magnification; a converter that converts the screen position information file based on the calculated magnification and the determined font size; and a screen generator that generates a screen compatible with the converted screen position information file.

According to still another embodiment, provided is a screen generating method for a screen generating system that includes: a server; and a screen generating apparatus. The screen generating method includes: at the server, storing, a screen position information file that sets a font size of a font included in a screen and position information of an image or a part included in the screen. The method includes at the screen generating apparatus, acquiring the screen position information file from the server; acquiring a screen display size of a display devise as a target display; calculating a magnification by using a predetermined screen display size and the acquired screen display size; determining a font size in the display devise as the target display based on the calculated magnification; converting the screen position information file based on the calculated magnification and the determined font size; and generating a screen compatible with the converted screen position information file.

The above and other objects, features, advantages and technical and industrial significance of the embodiment will be better understood by reading the following detailed description of presently preferred embodiments, when considered in connection with the accompanying drawings.

BRIEF DESCRIPTION OF THE DRAWINGS

FIG. 2 is a diagram illustrating an exemplary screen position information file;

FIG. 3 is a table illustrating an exemplary font setting file;

FIG. 4 is a table illustrating an exemplary corresponding image file;

DETAILED DESCRIPTION OF THE PREFERRED EMBODIMENTS

Screen generating apparatuses, screen generating systems, and screen generating methods according to embodiments will be described below with reference to the accompanying drawings. It is to be understood that the embodiments to be described hereunder do not intend to limit the scope of the invention.

First Embodiment

Functions of Screen Generating Apparatus According to a First Embodiment

Figure 1:
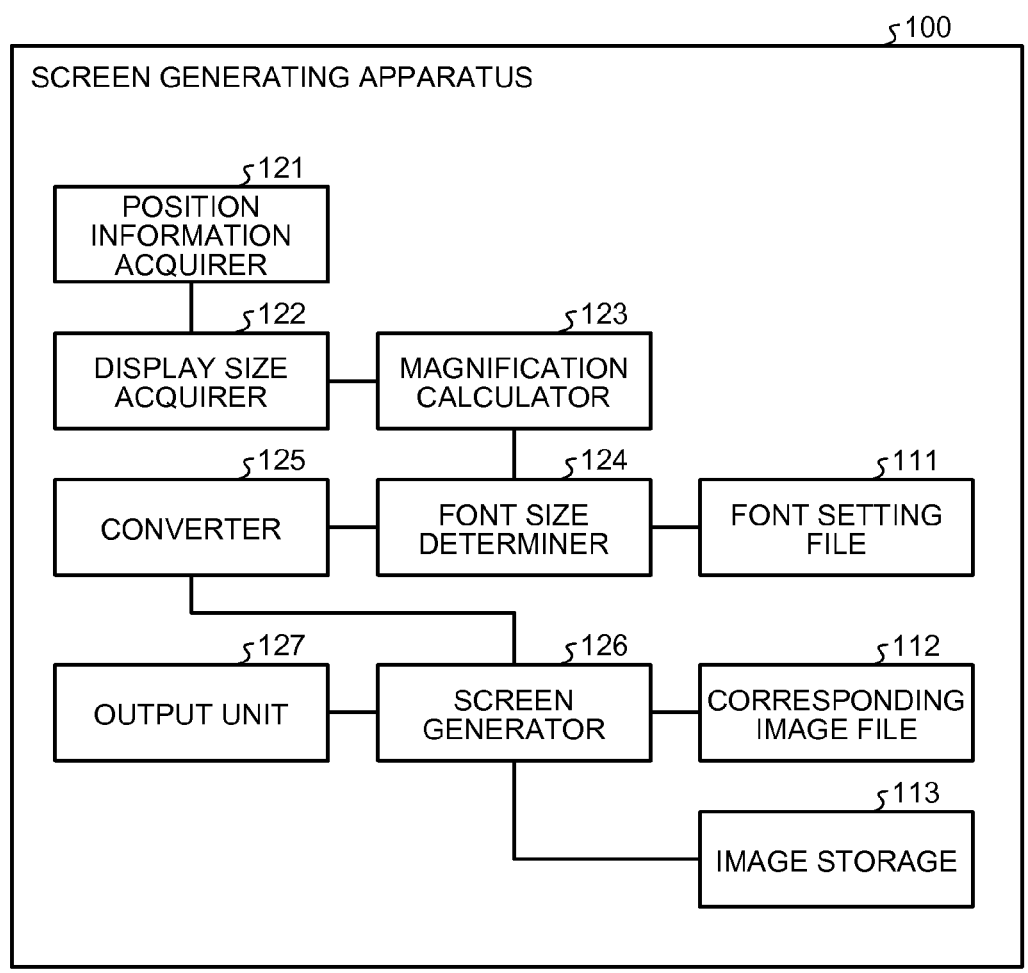
FIG. 1 is a functional block diagram illustrating an exemplary configuration of a screen generating apparatus according to a first embodiment.

Functions of a screen generating apparatus according to the first embodiment will be described below with reference to FIG. 1. FIG. 1 is a functional block diagram illustrating an exemplary configuration of the screen generating apparatus according to the first embodiment.

As illustrated in FIG. 1, a screen generating apparatus 100 includes, for example, a font setting file 111, a corresponding image file 112, and an image storage 113. The screen generating apparatus 100 further includes a position information acquirer 121, a display size acquirer 122, a magnification calculator 123, a font size determiner 124, a converter 125, a screen generator 126, and an output unit 127. The screen generating apparatus 100 generates a screen to be displayed on displays (display units, or display apparatuses) of different sizes by rewriting a setting file for use in screen generation without rearranging hardware or software.

The position information acquirer 121 acquires a screen position information file. The screen position information file sets, for example, a font size of a font included in the screen or position information of an image or a part included in the screen. The "part" refers to a label, a button, or the like included in the screen. The position information acquirer 121 may acquire the screen position information file from, for example, a setting personal computer (PC) connected to the screen generating apparatus 100 over a network. The position information acquirer 121 also acquires the language setting of the display as a target display from, for example, the setting PC as necessary. Specifically, the language setting does not need to be acquired as long as only a specific language is to be used. The language setting may, for example, be "English".

FIG. 2 is a diagram illustrating an exemplary screen position information file. As illustrated in FIG. 2, The screen position information file sets, for example, as position information of an image or a part included in the screen, a coordinate position defined by "x" and "y" relative to an end point, such as the upper left corner of the screen, a width "width" and a height "height" relative to the coordinate position used as a starting point, and a font size "fontSize" of a font. Such a screen position information file includes, for example, setting information for the font and the part for displaying a screen based on a display size of a display used by a user of the setting PC. Specifically, the screen position information file acquired by the position information acquirer 121 does not represent the setting information used for generating a screen display on displays of different sizes.

The display size acquirer 122 acquires a display size (screen display size) of the display as a target display. For example, the display size acquirer 122 acquires the display size of the display as the target display that may, for example, be a display of the screen generating apparatus 100 or a display connected to the screen generating apparatus 100 from the display.

The magnification calculator 123 calculates a magnification applicable when the screen display is to be generated based on the display size of the display as the target display. For example, the magnification calculator 123 calculates a magnification using a predetermined display size and a display size acquired by the display size acquirer 122. The predetermined display size is the display size of the display used by the user of the setting PC, specifically, the display size compatible with the setting information of the screen position information file acquired by the position information acquirer 121. Assume, for example, that the predetermined display size is "8.1 inches" and the display size of the display as the target display acquired by the display size acquirer 122 is "4.3 inches". Then, the magnification calculator 123 finds a magnification of "53%" through calculation.

The font size determiner 124 determines the font size in the display as the target display. For example, the font size determiner 124 refers to the font setting file 111 and determines the font size in the display as the target display based on the language setting acquired by the position information acquirer 121 and the magnification calculated by the magnification calculator 123. The magnification and the font size are set for each language in the font setting file 111.

FIG. 3 is a table illustrating an exemplary font setting file 111. As illustrated in FIG. 3, the font setting file 111 sets, for example, correspondence between a magnification (or a magnification range) and a font size applicable thereto. It is noted that, although the example illustrated in FIG. 3 does not give any magnifications greater than "100", the font setting file 111 may include fonts corresponding to magnifications of "100 to 120" or "120 to 140". Additionally, the reason why a flat font size is set for any magnifications "less than 40" in FIG. 3 is to prevent the screen image from becoming illegible due to a screen display generated using an excessively small font size. Furthermore, any greater magnifications may similarly be given a flat font size for, for example, magnifications of "250 or greater". The screen generating apparatus 100 retains the font setting file 111 for each language. The reason for retaining the font setting file 111 for each language is that a font size determined to be applicable to the same magnification among different languages may cause a character to become illegible depending on the form of the character.

An example of determining the font size using the font setting file 111 will be described below. The font size determiner 124 acquires the font size "$X_3$" that corresponds to the magnification of "40 to 60" of the font setting file 111 having "English" set for the language setting based on the language setting of "English" acquired by the position information acquirer 121 and a magnification of "53%" calculated by the magnification calculator 123. The acquired font size "$X_3$" is determined as the font size in the display as the target display. Having a range for the magnification in determining the corresponding font size as described above allows processing load to be lessened. The screen generating apparatus 100, if not compatible with using a plurality of languages, does not necessarily retain the font setting file 111 for each language. Furthermore, given a constant magnification, for example, if the screen generating apparatus 100 is compatible with screen display as switched from, for example, an "8.1-inch" to "4.3-inch" display, the screen generating apparatus 100 retains the font size "$X_3$" as a fixed value and may not necessarily use the font setting file 111.

The converter 125 converts the screen position information file based on the magnification and the font size corresponding to the display as the target display. For example, the converter 125 converts position information, such as an image or a part, included in the screen position information file acquired by the position information acquirer 121 according to the magnification calculated by the magnification calculator 123. The position information is converted through simple multiplication of the magnification. If a part contains subparts therein, however, relative position information with reference to the position information of a slightly larger part is applied to each of the individual sub-parts within the part. Additionally, the converter 125 converts the font size included in the screen position information file acquired by the position information acquirer 121 to a corresponding font size determined by the font size determiner 124.

The screen generator 126 generates a screen compatible with the converted screen position information file. For example, the screen generator 126 generates a screen that is compatible with a display size of the display as the target display based on the screen position information file that has undergone conversion by the converter 125 of the position information of the image or the part or the font size, and the magnification calculated by the magnification calculator 123. At this time, if the display screen includes an image, the screen generator 126 refers to the corresponding image file 112 and acquires a corresponding image from the image storage 113 and, using the acquired image, generates the screen. The corresponding image file 112 sets correspondence between a display size and a file name of an image to be displayed on a display having the display size. The image storage 113 stores images of various types set in the corresponding image file 112.

In generating parts in the screen based on the magnification, the screen generator 126 calculates the part size of each part according to the magnification and, if the calculated part size does not satisfy predetermined conditions, generates the part with a predetermined fixed part size. The part refers to a label, a button, or any other part included in the screen as described earlier. The predetermined conditions refer to a width "$W_1$" or more and a height "$H_1$" or more, and a width "$W_2$" or less and a height "$H_2$" or less ($W_1 < W_2$, $H_1 < H_2$), for example. Specifically, a part that is too small or too large may be less easy to view or operate and any part that does not satisfy the predetermined conditions is to be generated with the fixed part size. More specifically, if the width equals to or less than "$W_1$" or the height equals to or less than "$H_1$", or the width equals to or more than "$W_2$" or the height equals to or more than "$H_2$", the part is to be generated with the fixed part size.

FIG. 4 is a table illustrating an exemplary corresponding image file 112. In one example, the corresponding image file 112 sets a display size "8.1" that is keyed to an image file name "file A__8.1" for the image to be displayed on the display having the display size "8.1". In another example, the corresponding image file 112 sets a display size "4.3" that is keyed to an image file name "file A__4.3" for the image to be displayed on the display having the display size "4.3".

An example of generating a screen using the corresponding image file 112 and the image storage 113 will be described below. If the display screen in the display size "8.1" includes an image having the image file name "file A__8.1", the screen generator 126 acquires from the corresponding image file 112 the image file name "file A__4.3" for the image corresponding to the display size "4.3". The screen generator 126 then acquires from the image storage 113 the image corresponding to the acquired image file name "file A__4.3" and generates a screen using the acquired image.

The output unit 127 outputs the screen to the display. For example, the output unit 127 outputs the screen generated by the screen generator 126 to, for example, the display of the screen generating apparatus 100 or a display connected to the screen generating apparatus 100. It is to be noted that the output unit 127 may output the screen generated by the screen generator 126 to a predetermined external device.

The Flow in Screen Generating Operation According to First Embodiment

Figure 5:
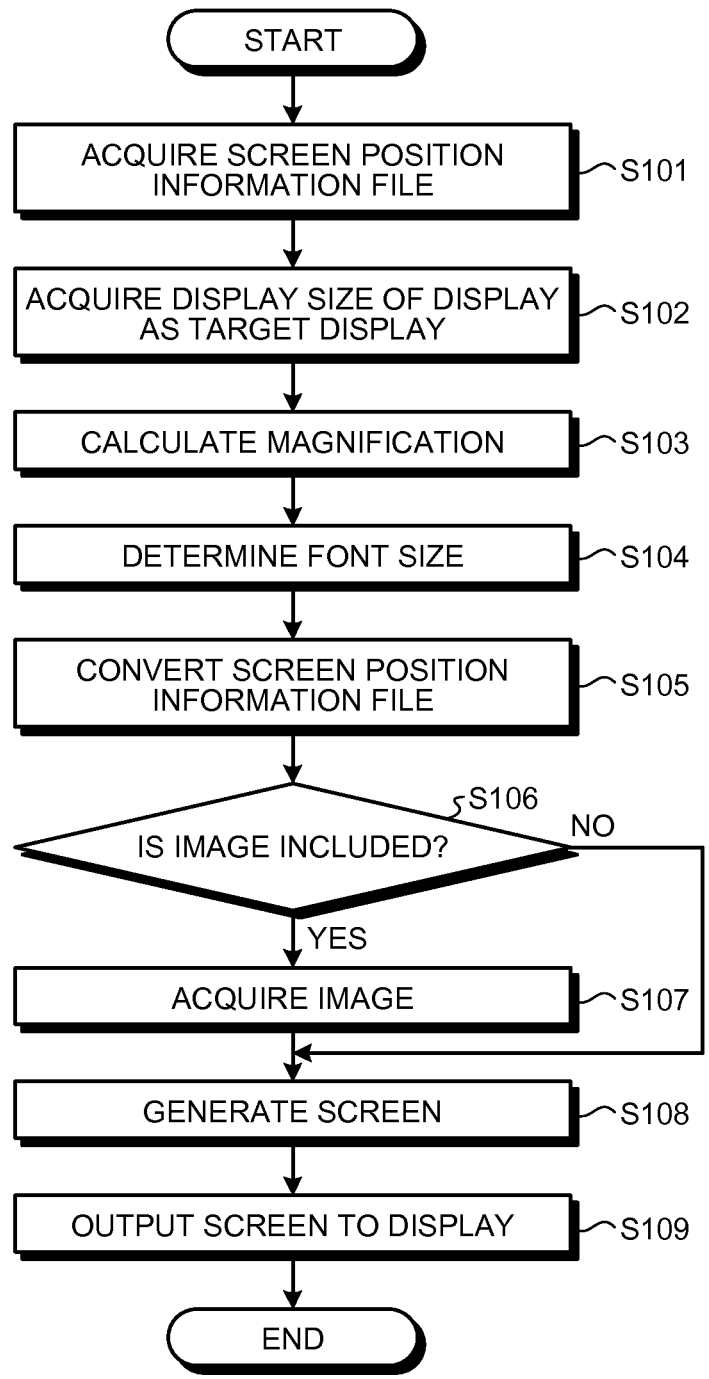
FIG. 5 is a flowchart illustrating exemplary steps in a screen generating process according to the first embodiment.

The flow in a screen generating operation according to the first embodiment will be described below with reference to FIG. 5. FIG. 5 is a flowchart illustrating exemplary steps in the screen generating process according to the first embodiment.

For example, as illustrated in FIG. 5, the position information acquirer 121 acquires a screen position information file from, for example, the setting PC connected to the screen generating apparatus 100 over a network (Step S101). At this time, the position information acquirer 121 also acquires the language setting for the display as the target display from, for example, the setting PC as necessary. In addition, the display size acquirer 122 acquires the display size of the display as the target display, for example, the display of the screen generating apparatus 100 or a display connected to the screen generating apparatus 100 from the display in question (Step S102).

The magnification calculator 123 calculates the magnification for the display size acquired by the display size acquirer 122 relative to a predetermined display size (Step S103). The font size determiner 124 refers to the font setting file 111 and determines the font size in the display as the target display based on the language setting acquired by the position information acquirer 121 and the magnification calculated by the magnification calculator 123 (Step S104).

The converter 125 converts the position information of, for example, the image or the part included in the screen position information file acquired by the position information acquirer 121 according to the magnification calculated by the magnification calculator 123. The converter 125 also converts the font size included in the screen position information file to the font size determined by the font size determiner 124 (Step S105). In addition, the screen generator 126 determines whether an image is included in the display screen (Step S106).

Upon determining that an image is included (Yes at Step S106), the screen generator 126 refers to the corresponding image file 112 to thereby acquire an image file name and acquires the image corresponding to the image file name from the image storage 113 (Step S107). The screen generator 126 then generates a screen compatible with the display size of the display as the target display based on, for example, the screen position information file converted by the converter 125 and the acquired image (Step S108). The screen generated in the foregoing manner includes a character, an image, or a part, such as a label or a button. Steps in a process for generating each part will be described later.

Upon determining that an image is not included (No at Step S106), the screen generator 126 generates a screen compatible with the display size of the display as the target display based on the screen position information file converted by the converter 125 (Step S108). Following the foregoing steps, the output unit 127 outputs the screen generated by the screen generator 126 to, for example, the display of the screen generating apparatus 100 or a display connected to the screen generating apparatus 100 (step S109).

Steps in Part Size Determining Process According to the First Embodiment

Figure 6:
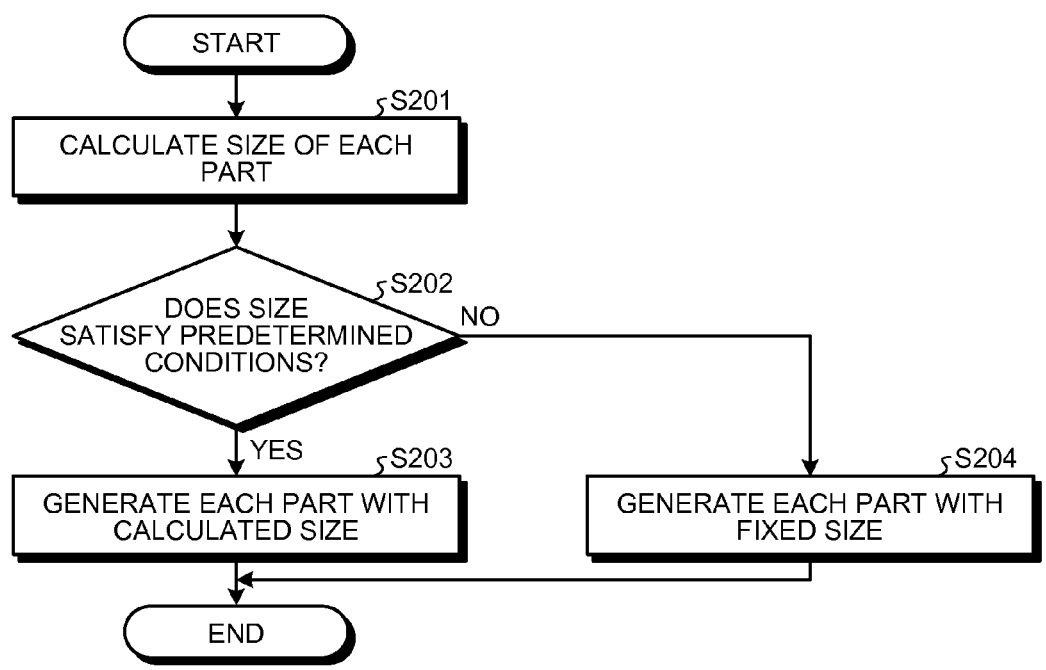
FIG. 6 is a flowchart illustrating exemplary steps in a part size determining process according to the first embodiment.

Steps in a part size determining process according to the first embodiment will be described below with reference to FIG. 6. FIG. 6 is a flowchart illustrating exemplary steps in the part size determining process according to the first embodiment. The part size determining process mainly represents specific details of the process at Step S108.

For example, as illustrated in FIG. 6, the screen generator 126 calculates the part sizes of a label, a button, or any other part according to the magnification calculated by the magnification calculator 123 (Step S201). The screen generator 126 then determines whether the calculated part size satisfies the predetermined conditions (Step S202). The predetermined conditions are used to ensure that a screen display of the part is not too small or too large when placed in the display as the target display. Specifically, the screen generator 126 uses predetermined threshold values for width and height to thereby determine whether the part size falls short of (too small a display) or exceeds (too large a display) the threshold values.

Upon determining that the part size satisfies the predetermined conditions (Yes at Step S202), the screen generator 126 generates each part with the calculated part size (Step S203). If it is determined that the part size does not satisfy the predetermined conditions (No at Step S202), the screen generator 126 generates each of the corresponding parts with the fixed part size (Step S204).

Advantageous Effects of First Embodiment

As described heretofore, the screen generating apparatus 100 converts the screen position information file that sets, for example, the font size and the position information of an image or a part in the screen based on the magnification compatible with the display size of the display as the target display and generates a screen based on the converted screen position information file. The screen generating apparatus 100 can therefore generate a sharp display easily on displays of different sizes. In other words, the screen generating apparatus 100 can generate a desired screen by simply converting the screen position information file involved in the screen generation. Therefore, a sharp display can be easily generated on displays of different sizes without requiring any additional development man-hours as compared with the related-art technique that is unable to generate a sharp display because of its failure to activate a specific resolution in time for matching a new display of a different size or that involves an increased number of man-hours required for rewriting the software.

Second Embodiment

While the screen generating apparatus 100 according to the first embodiment of the present invention has been described so far, the screen generating apparatus 100 may be embodied in various other forms. Different embodiments will thus be described below for (1) a screen generating system, (2) a configuration, and (3) a computer program.

(1) Screen Generating System

Figure 7:
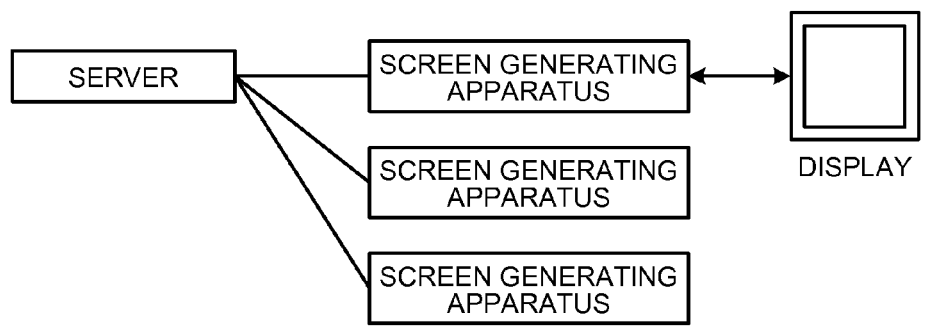
FIG. 7 is a diagram illustrating an exemplary configuration of a screen generating system.

The first embodiment has been described for a case in which the screen position information file is acquired from the setting PC. The screen position information file may be acquired from a server that retains the screen position information file. FIG. 7 is a diagram illustrating an exemplary configuration of a screen generating system. For example, as illustrated in FIG. 7, the screen generating system includes a server and a screen generating apparatus. Specifically, the server retains the screen position information file. The screen generating apparatus converts the screen position information file for use in screen display on the display as the target display and generates a screen.

The server retains the screen position information file transmitted from, for example, the setting PC and the language setting and the like for the display as the target display. The screen generating apparatus acquires, for example, the screen position information file and the language setting from the server. The screen generating apparatus acquires the display size of the display as the target display from the display as the target display. The display size may be acquired, for example, from a display connected to the screen generating apparatus as illustrated in FIG. 7 or from a display mounted on the screen generating apparatus.

Then, the screen generating apparatus calculates the magnification using a predetermined display size and the acquired display size. Thereafter, the screen generating apparatus determines the font size in the display as the target display based on the calculated magnification. The screen generating apparatus then converts the screen position information file based on the calculated magnification and the determined font size. Then the screen generating apparatus generates a screen according to the converted screen position information file. Detailed processing performed by the screen generating apparatus is the same as that in the first embodiment and the description therefor is omitted.

(2) Configuration

The process steps, control steps, specific names, and various types of data and information including parameters described in the foregoing descriptions and drawings may be modified in any way unless otherwise specified. For example, information included in the screen position information file or the font setting file 111 is not limited to that illustrated in FIG. 2 or 3. Specifically, the ranges of the magnifications included in the font setting file 111 are not limited to those illustrated in FIG. 3 and may be modified as appropriate.

Each of the elements that constitute the screen generating apparatus 100 illustrated in FIG. 1 is functionally conceptual and is not necessarily physically configured as illustrated. Specifically, the specific form of distribution or integration of the elements is not limited only to what is illustrated in FIG. 1; rather, the whole or part of the elements may be functionally or physically distributed or integrated in any unit depending on load, operating conditions, or any other situation. For example, the position information acquirer 121 and the display size acquirer 122 may be integrated with each other to form an "acquirer" that acquires the screen position information file from, for example, the setting PC and also acquires the display size of a display as the target display from the display.

(3) Computer Program

Figure 8:
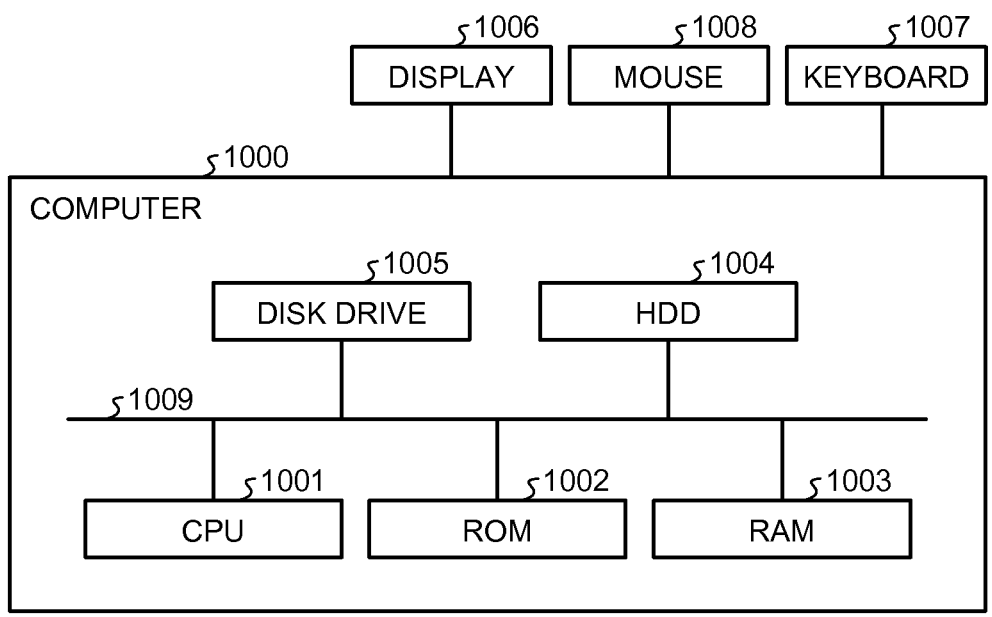
FIG. 8 is a diagram illustrating a screen generating program achieved through a computer.

FIG. 8 is a diagram illustrating a screen generating program achieved through a computer. For example, as illustrated in FIG. 8, a computer 1000 as the screen generating apparatus 100 has a hardware configuration incorporating an ordinary computer, including, connected to a bus 1009: a control unit such as a central processing unit (CPU) 1001; storages such as a read-only memory (ROM) 1002 and a random access memory (RAM) 1003; external storages such as a hard disk drive (HDD) 1004 and a disk drive 1005; a display such as a display 1006; and input devices such as a keyboard 1007 and a mouse 1008.

The screen generating program executed by the screen generating apparatus 100 is provided in one mode by being recorded on a computer-readable recording medium, such as a compact disc read only memory (CD-ROM), a flexible disk (FD), a CD recordable (CD-R), and a digital versatile disk (DVD), in an installable format or an executable format. The screen generating program executed by the screen generating apparatus 100 may also be configured so as to be stored in a computer connected to a network such as the Internet and to be downloaded over the network. The screen generating program executed by the screen generating apparatus 100 may be configured so as to be provided or distributed over a network such as the Internet. Additionally, the screen generating program may be provided by being incorporated in, for example, a ROM.

The screen generating program executed by the screen generating apparatus 100 has a modular configuration including each of the above-described functional units (the position information acquirer 121, the display size acquirer 122, the magnification calculator 123, the font size determiner 124, the converter 125, and the screen generator 126). A CPU (processor) as actual hardware reads the screen generating program from a storage medium and executes it. This loads each of the abovementioned functional units on the main storage, creating the position information acquirer 121, the display size acquirer 122, the magnification calculator 123, the font size determiner 124, the converter 125, and the screen generator 126 on the main storage.

Each of the functional units of the screen generating apparatus 100 described in the first embodiment may be included in an image forming apparatus (a multi-function printer (MFP)) having at least one function out of a copier function, a printer function, and a scanner or facsimile function. Specifically, the image forming apparatus has a function of generating a screen to be displayed on, for example, an operating display of the image forming apparatus.

Figure 9:
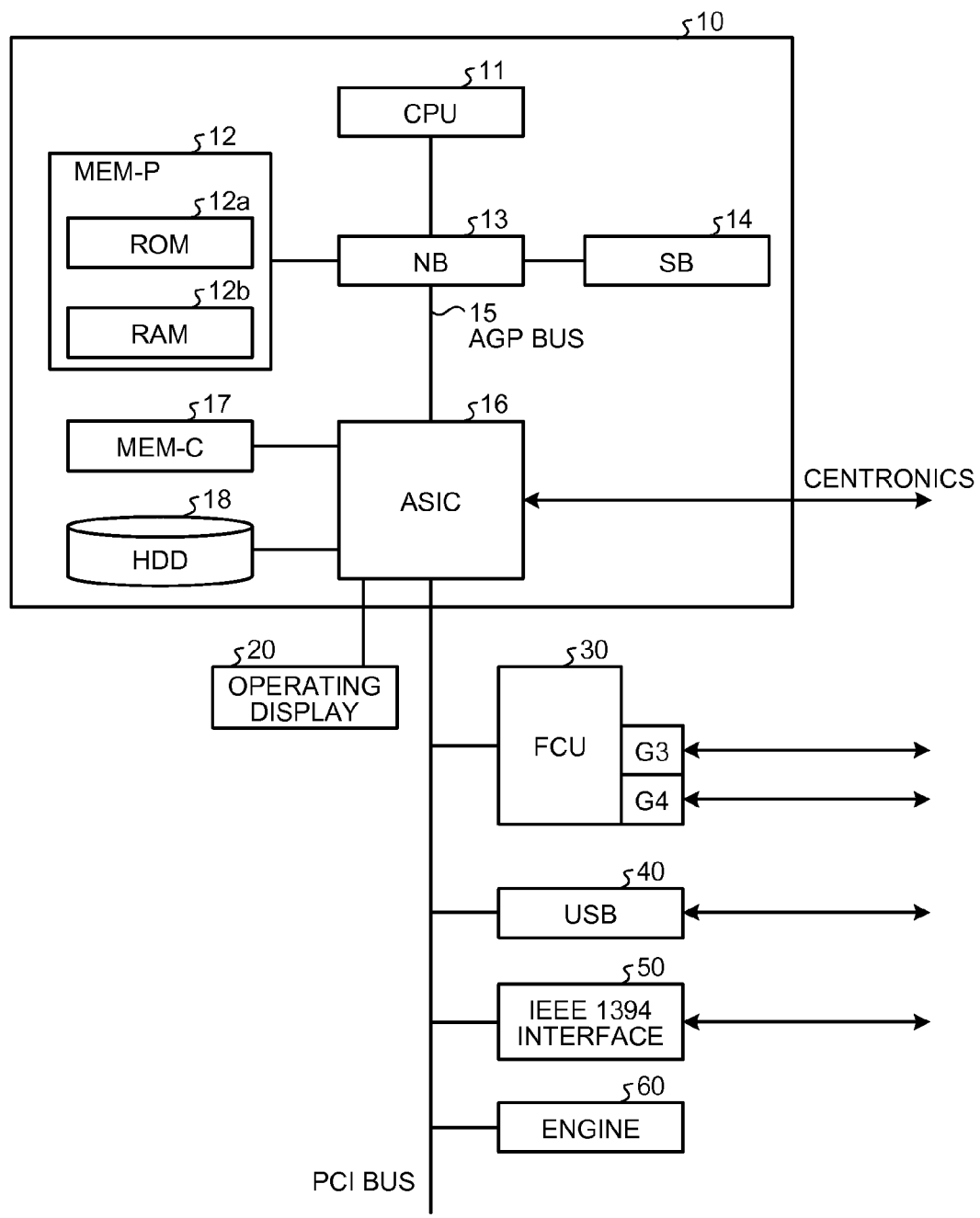
FIG. 9 is a block diagram illustrating a hardware configuration of a Multi Function Peripheral (MFP) including an image forming apparatus.

FIG. 9 is a block diagram illustrating a hardware configuration of an MFP including an image forming apparatus. For example, as illustrated in FIG. 9, the MFP is configured to include a controller 10 connected to an engine 60 with a PCI bus. The controller 10 controls the entire MFP, drawing, communication, and inputs from an operating unit not illustrated. The engine 60 is, for example, a printer engine to be connected to the PCI bus. Examples of the engine 60 include, but are not limited to, a black-and-white plotter, a one-drum color plotter, a four-drum color plotter, and a scanner or a fax unit. It is noted that the engine 60 includes an image processor such as error diffusion and gamma conversion in addition to what is called an engine such as a plotter.

The controller 10 includes a CPU 11, a north bridge (NB) 13, a system memory (MEM-P) 12, a south bridge (SB) 14, a local memory (MEM-C) 17, an application specific integrated circuit (ASIC) 16, and a hard disk drive (HDD) 18. The north bridge 13 is connected to the ASIC 16 with an accelerated graphics port (AGP) bus 15. The MEM-P 12 includes a read-only memory (ROM) 12a and a random access memory (RAM) 12b.

The CPU 11 controls general operations of the MFP and includes a chipset including the north bridge 13, the MEM-P 12, and the south bridge 14. The CPU 11 is connected to other devices via this chipset.

The north bridge 13 is a bridge for connecting the CPU 11, the MEM-P 12, the south bridge 14, and the AGP bus 15. The north bridge 13 includes a memory controller, a PCI master, and an AGP target for controlling, for example, reading from and writing to the MEM-P 12.

The MEM-P 12 is a system memory used for storing and loading computer programs and data, for drawing data for a printer, and other purposes. The MEM-P 12 includes the ROM 12a and the RAM 12b. The ROM 12a is a read-only memory used for storing therein computer programs and data. The RAM 12b allows data to be written therein or read therefrom, used for loading computer programs and data, drawing data for a printer, and other purposes.

The south bridge 14 is a bridge for connecting the north bridge 13 to a PCI device or a peripheral device. The south bridge 14 is connected to the north bridge 13 via a PCI bus that, in turn, connects to, for example, a network interface (I/F).

The ASIC 16 is an integrated circuit (IC) for use in image processing, including a hardware element for image processing. The ASIC 16 functions as a bridge for connecting the AGP bus 15, the PCI bus, the HDD 18, and the MEM-C 17 to each other. The ASIC 16 includes a PCI target and an AGP master, an arbiter (ARB) that serves as the core of the ASIC 16, a memory controller that controls the MEM-C 17, a plurality of direct memory access controllers (DMACs) that revolve or otherwise operate image data through, for example, a hardware logic, and a PCI unit that performs data transfer relative to the engine 60 via the PCI bus. The ASIC 16 connects to a facsimile control unit (FCU) 30, a universal serial bus (USB) 40, and an Institute of Electrical and Electronics Engineers (IEEE) 1394 interface 50 via the PCI bus. An operating display 20 is directly connected to the ASIC 16.

The MEM-C 17 is a local memory used as a copying image buffer and a code buffer. The HDD 18 is a storage storing therein image data, computer programs, font data, and forms.

The AGP bus 15 is a bus interface for a graphics accelerator card developed for speeding up graphics processing. Making direct access to the MEM-P 12 with high a throughput, the AGP bus 15 speeds up the graphics accelerator card.

The screen generating program executed by the image forming apparatus is provided by being incorporated in, for example, a ROM in advance. For example, the screen generating program executed by the image forming apparatus may be configured so as to be provided as a computer program product by being recorded in a computer-readable recording medium such as a CD-ROM, a flexible disk (FD), a CD-R, and a DVD in an installable format or an executable format.

An aspect of the embodiments can achieve an advantageous effect of being capable of easily generating a sharp display on displays of different sizes without requiring any additional development man-hours.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a memory having computer readable instructions stored thereon; and
   at least one processor configured to execute the computer readable instructions to,
   acquire a screen position information file from a setting computer, the screen position information file indicating a font size of a font included in a screen of the setting computer, font dimension information, and position information of an image or a part included in the screen of the setting computer, the position information including a coordinate position of the image or the part included in the screen, the coordinate position indicating a position relative to an endpoint associated with the screen,
   acquire a first screen display size of a first display device, the first display device associated with the image forming apparatus,
   calculate a magnification by using a second display size of a second display device, the second display device associated with the setting computer, and the acquired first screen display size,
   determine a font size in the first display device based on the calculated magnification,
   convert the font size, the font dimension information, and the position information indicated by the screen position information file based on the calculated magnification and the determined font size, and generate a screen for the image forming apparatus that is compatible with the converted screen position information file.

2. The image forming apparatus according to claim 1, wherein
the processor is further configured to execute the computer readable instructions to acquire an image compatible with the acquired first screen display size and generate the screen of the image forming apparatus using the acquired image when an image is included in the screen of the setting computer.

3. The image forming apparatus according to claim 1, wherein the processor is further configured to execute the computer readable instructions to:
store therein a font setting file that sets the magnification and the font size for each language;
acquire a language setting for the first display device associated with the image forming apparatus;
refer to the font setting file; and
determine a font size in the first display device associated with the image forming apparatus compatible with the acquired language setting and the calculated magnification.

4. The image forming apparatus according to claim 1, wherein the processor is further configured to execute the computer readable instructions to generate the part with a desired fixed size when a size of a part included in the screen of the setting computer does not satisfy a desired condition.

5. The image forming apparatus according to claim 1, wherein the processor is further configured to execute the computer readable instructions to output the generated screen to the first display device associated with the image forming apparatus.

6. A screen generating system comprising:
a server; and
an image forming apparatus;
the server including,
a first memory having stored therein a screen position information, the screen position information file indicating a font size of a font included in a screen of a setting computer, font dimension information, and position information of an image or a part included in the screen of the setting computer, the position information including a coordinate position of the image or the part included in the screen, the coordinate position indicating a position relative to an endpoint associated with the screen, and
the image forming apparatus including,
a second memory having computer readable instructions stored thereon; and
at least one processor configured to execute the computer readable instructions to,
acquire the screen position information file from the server;
acquire a first screen display size of a first display device, the first display device associated with of the image forming apparatus;
calculate a magnification by using a second display size of a second display device, the second display device associated with of the setting computer and the acquired first screen display size;
determine a font size in the first display device associated with the image forming apparatus based on the calculated magnification;
convert the font size, the font dimension information, and the position information indicated by the screen position information file based on the calculated magnification and the determined font size; and
generate a screen for the image forming apparatus that is compatible with the converted screen position information file.

7. The screen generating system according to claim 6, wherein the processor is further configured to execute the computer readable instructions to acquire an image compatible with the acquired screen display size and generate the screen using the acquired image when an image is included in the screen of the setting computer.

8. The screen generating system according to claim 6, wherein
the second memory has stored therein a font setting file that sets the magnification and the font size for each language; and
the processor is further configured to execute the computer readable instructions to,
acquire language setting for the first display device associated with the image forming apparatus,
refer to the font setting file, and
determine a font size in the first display device associated with the image forming apparatus compatible with the acquired language setting and the calculated magnification.

9. The screen generating system according to claim 6, wherein
the processor is further configured to execute the computer readable instructions to generate the part with a desired fixed size when a size of a part included in the screen of the setting computer does not satisfy a desired condition.

10. The screen generating system according to claim 6, wherein
the processor is further configured to execute the computer readable instructions to output the generated screen to the first display device associated with the image forming apparatus.

11. A screen generating method for a screen generating system that includes a server and an image forming apparatus, the screen generating method comprising:
at the server,
storing, a screen position information file, the screen position information file indicating a font size of a font included in a screen of a setting computer, font dimension information, and position information of an image or a part included in the screen of the setting computer, the position information including a coordinate position of the image or the part included in the screen, the coordinate position indicating a position relative to an endpoint associated with the screen; and
at the image forming apparatus,
acquiring the screen position information file from the server,
acquiring a first screen display size of a first display device, the first display device associated with of the image forming apparatus,
calculating a magnification by using a second display size of a second display device, the second display device associated with of the setting computer and the acquired first screen display size,
determining a font size in the first display device on the calculated magnification,
converting the font size, the font dimension information, and the position information indicated by the screen position information file based on the calculated magnification and the determined font size, and generating a screen for the image forming apparatus that is compatible with the converted screen position information file.

12. The screen generating method according to claim 11, wherein
the acquiring includes acquiring an image compatible with the acquired first screen display size and generating the screen using the acquired image when an image is included in the screen of the setting computer.

13. The screen generating method according to claim 11, further comprising:
at the image forming apparatus,
storing a font setting file that sets the magnification and the font size for each language,
acquiring language setting for the first display device associated with the image forming apparatus,
referring to the font setting file, and
determining a font size in the first display device associated with the image forming apparatus compatible with the acquired language setting and the calculated magnification.

14. The screen generating method according to claim 11, wherein
the generating includes generating the part with a desired fixed size when a size of a part included in the screen of the setting computer does not satisfy a desired condition.

15. The screen generating method according to claim 11, wherein the method further comprises:
at the image forming apparatus, outputting the generated screen to the first display device.

16. An image forming apparatus comprising a processor configured to:
acquire a screen position information file from a setting computer, the screen position information file indicating a font size of a font included in a screen of the setting computer, font dimension information, and position information of an image or a part included in the screen of the setting computer, the position information including a coordinate position of the image or the part included in the screen, the coordinate position indicating a position relative to an endpoint associated with the screen;
acquire a first screen display size of a first display device, the first display device associated with of the image forming apparatus;
calculate a magnification by using a second display size of a second display device, the second display device associated with of the setting computer and the acquired first screen display size;
determine a font size in the first display device of the image forming apparatus based on the calculated magnification;
convert the font size, the font dimension information, and the position information indicated by the screen position information file based on the calculated magnification and the determined font size; and
generate a screen for the image forming apparatus that is compatible with the converted screen position information file.

17. The image forming apparatus according to claim 16, wherein the processor is configured to:
acquire an image compatible with the acquired first screen display size when an image is included in the screen of the setting computer; and
generate the screen of the image forming apparatus using the acquired image.

18. The image forming apparatus according to claim 16, wherein
the processor is configured to store a font setting file that sets the magnification and the font size for each language, and
in the acquiring the first screen display size, the processor is further configured to acquire a language setting for the first display device associated with the image forming apparatus, and
in the determining the font size, the processor is configured to,
refer to the font setting file, and
determine a font size in the first display device associated with the image forming apparatus compatible with the acquired language setting and the calculated magnification.

19. The image forming apparatus according to claim 16, wherein in the generating the screen for the image forming apparatus that is compatible with the converted screen position information file, the processor is further configured to:
generate a part with a desired fixed size when a size of the part included in the screen of the setting computer does not satisfy a desired condition.

20. The image forming apparatus according to claim 16, the processor is further configured to:
output the generated screen to the first display device associated with of the image forming apparatus.

* * * * *